Feb. 9, 1960     W. H. DU SHANE ET AL     2,924,285
IMPLEMENT CONTROL SYSTEM

Filed Nov. 7, 1956     4 Sheets-Sheet 1

INVENTORS
W. H. Du SHANE
H. K. KIENZLE

*INVENTORS*
*W. H. Du SHANE*
*H. K. KIENZLE*

INVENTORS
W. H. Du SHANE
H. K. KIENZLE

Feb. 9, 1960 W. H. DU SHANE ET AL 2,924,285
IMPLEMENT CONTROL SYSTEM
Filed Nov. 7, 1956 4 Sheets-Sheet 4

INVENTORS
W. H. Du SHANE
H. K. KIENZLE

United States Patent Office 2,924,285
Patented Feb. 9, 1960

2,924,285

IMPLEMENT CONTROL SYSTEM

Wallace H. Du Shane and Harold K. Kienzle, Waterloo, Iowa, assignors, by mesne assignments, to Deere & Company, a corporation of Delaware Application November 7, 1956, Serial No. 620,845

27 Claims. (Cl. 172—4)

This invention relates to an implement control system as applied to the control of tractor-drawn implements, and relates still more especially to automatic load and leveling control for such implements.

Implements connected directly to tractors, sometimes known as integral implements, perform significantly better if they are kept parallel to the ground. This is of particular importance when the land is rolling. In some cases, the hitch includes mechanical linkage purportedly designed to accomplish the result by relating the center of rotation of the implement directly to the line of draft. In cases in which the line of draft is low, the center of rotation of the implement is too far forward to contribute to the necessary levelling. According to the present invention, the center of rotation of the implement is fixed, regardless of the line of draft, with the necessary correcting energy supplied by power-operated means on the tractor. An important feature in keeping the implement parallel to the ground in operation is the derivation therefrom of the benefit of a more nearly true draft signal, because this arrangement eliminates false high pressures due to high ground pressure on the rear of a long implement in going through a swale, for example, or a false low pressure due to low ground pressure on the rear of long implement going over a hill.

The invention features the provision of novel and relatively simple means incorporating the desirable characteristics of draft or load control with the automatically levelling arrangement. The invention has as another object the provision of means for selectively using load or position control. A still further object is the interconnection of the levelling system to impose position-responsive forces on the control system during operation of the levelling means.

The implement control herein featured coordinates the functions of a pair of implement-adjusting means on the tractor, which adjusting means will hereinafter be referred to, for the purposes of brevity and simplicity, as rockshafts, one of which is connected to the implement for raising and lowering the implement and the other of which is connected to the implement for adjusting the implement fore-and-aft. The implement control system involves the control of the fore-and-aft adjusting rockshaft by servo mechanism from the lift rockshaft, the result of which is to connect the implement to the tractor about a virtual center of rotation of the implement in a transverse vertical plane approximately through the center line of the rear axle of the tractor while the implement is in working position. Provision is made for locking out the servo mechanism when the control means for the lift rockshaft is moved to one of its extreme positions, whereby the hitch linkage has increased lift capacity and the transport angle of the implement is improved. The arrangement also provides that the virtual center of rotation of the implement during the lifting cycle is somewhere near or ahead of the tractor front wheels. It is another object of the invention to provide independent control means for locking out the leveling linkage for operation of the implement in situations in which automatic fore-and-aft leveling is not required.

The invention has for another object an independent control for effecting adjustment of the fore-and-aft adjusting rockshaft independently of its adjustment by the lift rockshaft. Still further features reside in improved control means comprising a relatively compact and simple arrangement of parts that may be inexpensively manufactured, assembled and maintained, with provision being made for appropriate adjustment so that the widest flexibility in operation is accommodated.

The foregoing and other important objects and desirable features inherent in and encompassed by the invention will become apparent as a preferred embodiment thereof is disclosed in detail in the ensuing specification and accompanying sheets of drawings, the several figures of which will be described immediately below.

Figure 1:
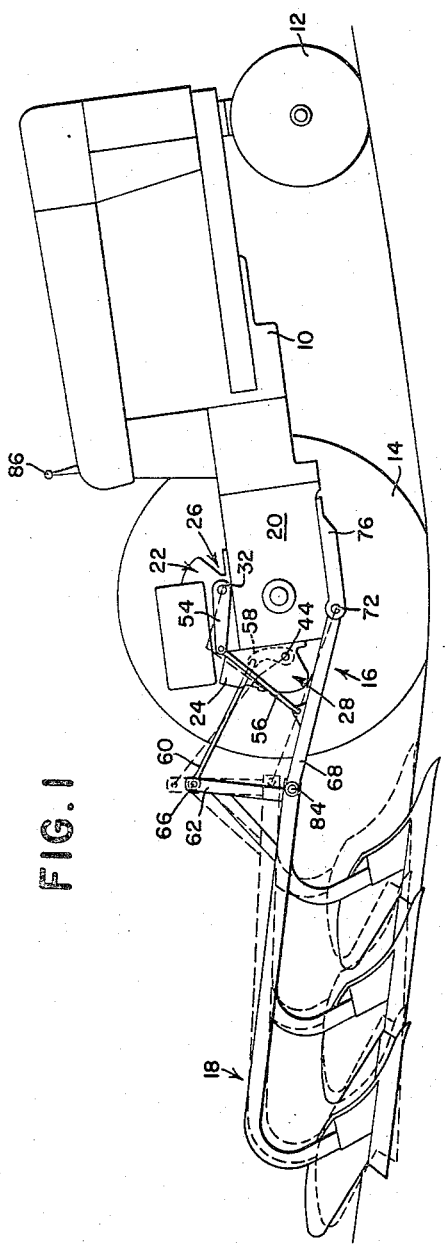
Figs. 1 and 2 illustrate, somewhat pictorially, the relative positions of a tractor and implement when passing respectively through a swale or over a ridge, the dotted lines in each instance illustrating the position that the implement would assume in the absence of a control like that forming the subject matter of the present invention.
Figure 2:
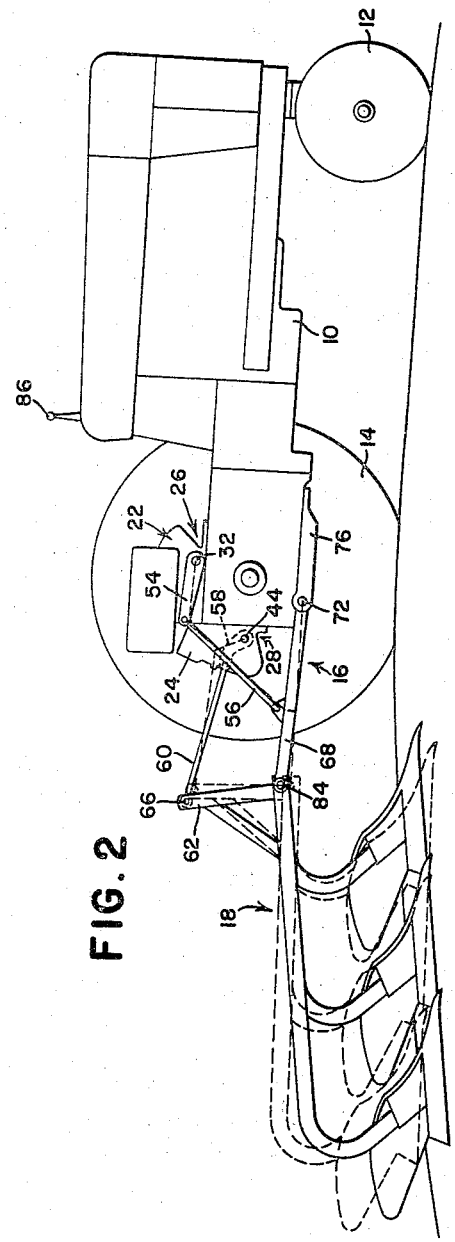

The tractor chosen for purposes of illustration may be considered as representative of any of the commercially well-known types and comprises a fore-and-aft body 10 supported on front and rear wheels 12 and 14, respectively, the right hand rear wheel in each of Figs. 1 and 2 having been omitted to illustrate the hitch linkage 16 by means of which the implement 18 is connected to the tractor. The implement shown is a three-bottom plow, which is selected as illustrative because of its performance characteristics as concerns the desirability for fore-and-aft leveling.

Figure 3:
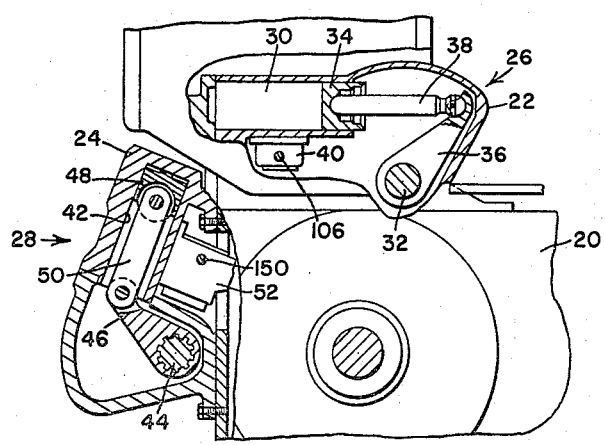
Fig. 3 is an enlarged elevational view, partly in section, of the rear portion of the tractor, showing the two power-operated devices and rockshafts thereon.

The rear portion of the tractor body is conventionally in the form of a transmission and final drive casing 20 which affords support means for the several components to be presently described. This casing carries externally thereof, at least in part, a pair of attachment housings 22 and 24, the first of which contains a first power-operated device or lift means 26 and the second of which contains a second power-operated device or tilt means 28 (Fig. 3).

The lift means 26 is here shown as comprising a hydraulic cylinder 30, a first or lift rockshaft 32, a piston 34 in the cylinder, an internal arm 36 keyed to the rockshaft, and a piston rod 38 interconnecting the piston and the arm 36. The control of hydraulic fluid to and from the cylinder 30 is effected by a first actuator, here a control valve 40 of any typically satisfactory construction.

The second device or tilt means 28 comprises a hydraulic cylinder 42, a tilt rockshaft or member 44, an internal arm 46 keyed to the rockshaft 44, a piston 48, and a piston rod 50 interconnecting the piston and the arm 46. Control of hydraulic fluid to and from the cylinder 42 is effected by a second actuator 52 which, like the actuator 40, may be any suitable control valve, The rockshaft 32 extends transversely of the tractor and has rigidly secured to each of its opposite ends a rearwardly extending lift arm 54 which is connected by a depending lift link 56 to part of the hitch linkage 16. The second or tilt rockshaft 44 likewise extends transversely of the tractor and has a single external arm 58 which is connected by a fore-and-aft extending or top link 60 to a rigid upright mast 62 on the implement 18. The connection of the link 60 between the external second rockshaft arm 58 and the mast 62 includes pivots 64 and 66 respectively at the arm and the mast. This affords the necessary vertical flexibility which combines with the vertical flexibility of the hitch linkage 16, of which the top link 60 may be considered a part. The hitch linkage further includes a pair of lower links 68 and 70 (Fig. 5) which extend trailingly from the tractor to the implement. The hitch or draft links are pivotally connected at their forward ends to a transverse pivot shaft 72 which is appropriately supported in a lower portion 74 of the rear body part 20 of the tractor. An under frame portion 76, rigid on the tractor, has opposite outer end portions slotted at 78 to receive and provide a limited amount of fore-and-aft movement for opposite ends of the pivot shaft 72. Portions of the shaft 72 just inwardly of the links 68 and 70 are supported in the tractor part 74 in such manner that rearward tensional forces exerted through the links 68 and 70 on opposite end portions of the pivot pin or bar 72 will cause the latter to bend in such manner that a control portion 82 thereof will be displaced forwardly. The shaft or bar 72 is appropriately resilient so that it will return to its normal straight condition upon the disappearance of the forces noted. By the same token, compressional forces applied through the links 68 and 70 will cause rearward displacement of the central portion 82 of the bar 72. As will be outlined below, this characteristic of the bar 72 is utilized in affording draft or load control for the tractor-implement outfit.

The links 68 and 70 are pivotally connected at 84 on a transverse axis to the front end of the implement 18.

From the description thus far, it will be seen that the first or lift device 26 is operative to adjust the vertical position of the implement and that the second or tilt device 28 is operative to adjust the fore-and-aft phase or tilt of the implement. In the first instance, the lift links 56 constitute force-transmitting means between the lift device 26 and the implement, operating via the draft linkage 16. The top link 60 is a force-transmitting connection between the implement and the tilt device 28. Operation of the devices depends, of course, upon operation of the respective valves or actuators 40 and 52, the general arrangement of which is schematically illustrated in Fig. 4, from which it will be seen that the tractor, as is conventional, is equipped with any suitable source of hydraulic power, here a variable-displacement pump which supplies the actuators 40 and 52.

The actuator 40 is under control of a manual control means, here a control lever 86, which may be mounted in any convenient location on the tractor (Fig. 1). This control lever is connected through intervening mechanism, including load-responsive means and position-responsive means, the details of which will be presently described, to the actuator 40, for shifting the actuator to either side of a neutral position as suggested in Fig. 4. In that figure, the actuator 40 is in its neutral position, illustrating that the cylinder 30 is isolated from pump pressure.

The actuator 52 is likewise initially under the control of manual control means such as a control lever 88, the location of which on the tractor may be proximate to the control lever 86. Intervening means, including position-responsive means to be elaborated below, interconnects the control lever 88 and the actuator 52 for shifting the latter to either side of a neutral position, which position is shown in Fig. 4. The hydraulic device 26 is of the one-way type, whereas the device 28 is a two-way motor. Consequently, the diagrammatic illustrations of the actuators 40 and 52 are fundamentally different. However, since these actuators or valves may be replaced by any other having suitable operational characteristics, the details are unimportant.

Figure 4:
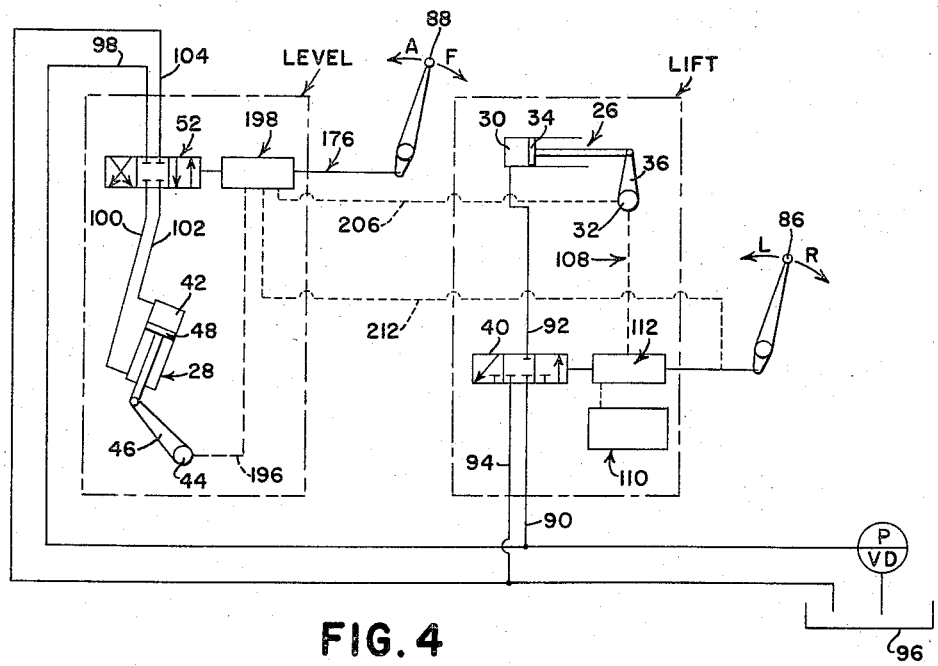
Fig. 4 is a schematic diagram of a typical hydraulic circuit for use in controlling the two power-operated means.

For the purposes of general clarification, the dot-dash boxes respectively embracing the power devices 26 and 28 and the respective related components are designated "Lift" and "Level." Ignoring for the moment the intervening details of the draft-responsive and position-responsive means as respects the "Lift" control, it will be seen from Fig. 4 that clockwise rocking of the lever 86, or movement thereof to the front as considered relative to its position on the tractor, shifts the actuator rearwardly or to the left as seen in the drawings, thus establishing fluid communication between a fluid line 90 from the pump and a fluid line 92 to the lift cylinder 30. This extends the motor or cylinder and piston assembly 30—34 and causes clockwise rocking of the lift rockshaft 32, thereby effecting raising of the implement 18 via the lift links 56 and hitch or draft linkage 16. The respective directions of movement of the lever 88 are indicated by the letters L and R. This designation is repeated in Fig. 5.

When the lever 86 is moved in its L direction, the actuator 40 connects the cylinder line 92 to an exhaust line 94 which leads to the reservoir 96.

Figure 5:
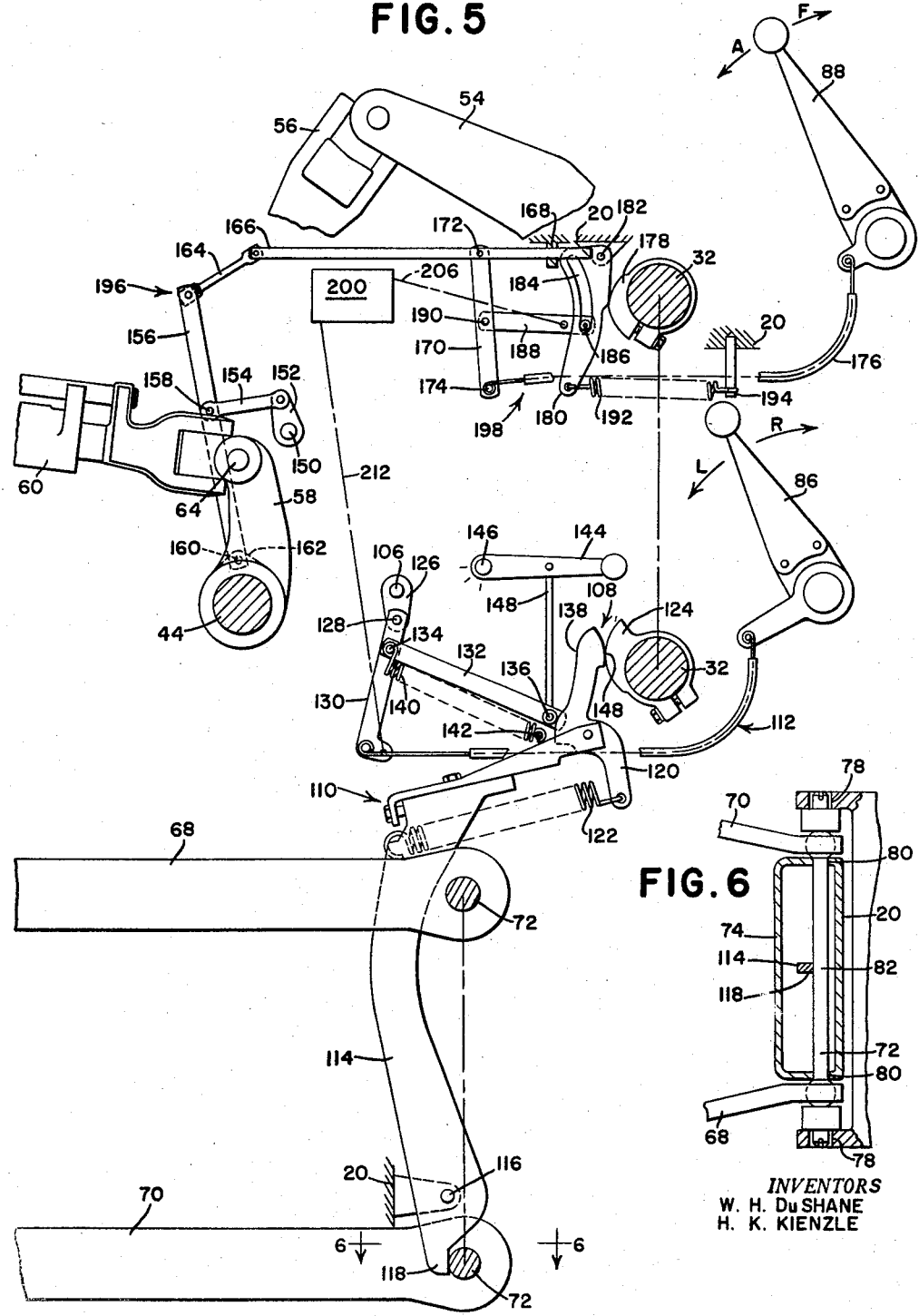
Fig. 5 is an enlarged schematic view, illustrating the relationship of the two power devices to each other, to the draft linkage, and to the manual control means therefor.
Figure 6:
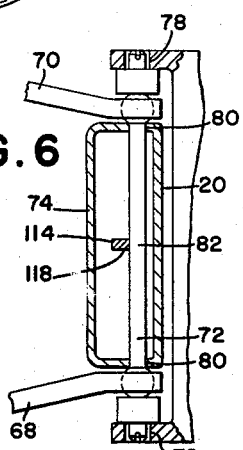
Fig. 6 is a fragmentary section as seen generally along the line 6—6 of Fig. 5.

The directions of movement of the tilt lever 88 are designated by the letters A and F, corresponding respectively to "aft" and "fore." Again, the designation is repeated in Fig. 5.

When the lever 88 is rocked forwardly or in its F direction (clockwise), the actuator 52 is shifted rearwardly or to the left as seen in Fig. 4, connecting a pump line 98 to a cylinder line 100 and connecting another cylinder line 102 to a reservoir line 104, thus contracting the cylinder-piston assembly 42—48 and causing clockwise rocking of the tilt rockshaft 44, whereupon the implement is tilted forwardly or in such direction that the noses of the plow bottoms point downwardly. When the control lever 88 is moved to the rear or in its "A" direction, the actuator 52 is shifted forwardly or to the right as seen in Fig. 4, and the connections between the lines 98 and 104 respectively to the cylinder lines are reversed, whereby the cylinder line 102 becomes a pressure line and the cylinder line 100 becomes an exhaust line, resulting in forcible counterclockwise rocking of the rockshaft 44 for tilting the implement rearwardly, or in such direction that the noses of the plow bottoms point upwardly.

The main lift device 26 is, as previously described, controlled by the actuator 40, and this actuator is of the type including an actuating rockshaft 106 (Figs. 3 and 5) which is responsive to adjustment of the manual control member or lever 86 as well as being responsive to the position of the implement via the main rockshaft 32 and further responsive to draft or load imposed on the implement. In the schematic illustration in Fig. 4, the position-responsive control is represented by the dotted line 108, the draft control is represented by the box 110, and the mechanism interconnecting the position-responsive means, the draft-responsive means and the control lever 86 is schematically illustrated by the box 112. The mechanical equivalents of these components appear in Fig. 5.

The draft control 110 includes a draft or load signal responder 114 in the form of a beam pivoted at 116 to a rear portion of the tractor transmission casing 20 and depending below the pivot to have its lower end at 118 engaged behind the mid-portion 82 of the load-responsive bar 72. The upper end of the beam or lever 114 pivotally mounts a follower 120 which is biased by a spring 122 into engagement with or to ride on a position responder cam 124 fixed to the main lift rockshaft 32. It will be seen that as the spring 122 urges the follower 120 against the cam 124, it also urges the lower end 118 of the draft responder against the mid-portion 82 of the draft bar 72.

The actuator rockshaft 106 for the actuator or valve 40 has affixed thereto a depending arm 126 which has a pivotal connection at 128 with a control member or depending arm 130. The lower end of this arm is connected to the manual control lever 86 by the means 112, which is here shown as a conventional sheathed control wire; although, any other connecting means may be used.

A force-transmitting link 132 is pivotally connected at one end at 134 to the arm 130 just below the pivot 128 and has at its other end a roller 136 which is adjustable along an arcuate edge portion 138 on the back of the follower 120, this edge being arcuate about the pivot point 134. A tension spring 140 is connected at one end to the pivot 134 and is anchored at its other end at 142 to a portion of the tractor body and serves to maintain engagement between the roller 136 and the arcuate edge portion 138. Responsiveness of the actuator 40 to either the position of the rockshaft 32 or to movement of the draft responder 114, or to a combination of the two, depends upon the position of the link 132 along the edge 138, which position is selectively settable by means of a selector lever 144 which is appropriately rockably mounted on the tractor body at 146 and which is connected by a link 148 to the link 132.

The position of the parts, just described, as shown in Fig. 5, will produce draft or load control and the actuator 40 will not be responsive to the position of the rockshaft 32, because the roller 136 is engaged with the lower portion of the follower 120 and will therefore respond to changes in position of the follower 120 according to changes in position of the draft responder 114 as distinguished from changes in position of the follower 120 according to changes in position of the rockshaft 32. That is to say, as the draft responder 114 moves fore or aft, as the case may be, it will pivot about the point 116 on the tractor body 20, thus swinging its upper end, which carries the follower 120, fore or aft. The follower 120 will pivot at its front edge at 148 on the rockshaft cam 124, and this pivoting will transmit force through the link 132 to the arm 130 and in turn to the actuator rockshaft 106. Assuming that the draft responder 114 is stationary and that the rockshaft 32 changes angular position, the follower 120 will pivot about its connection to the upper end of the draft responder 114, but, since the roller 136 is so close to this pivot, the force-transmitting characteristics of the follower 120 are negligible.

However, position-responsive characteristics can be achieved by swinging the selector lever 144 upwardly so that the roller 136 initially engages the follower edge 138 at an upper portion thereof, in which case the actuator may be made responsive solely to the position of the rockshaft 32 to the exclusion of changes in position of the draft responder 114. In either case, the actuator is still responsive to changes in position of the manual control means 86. Operation of the mechanism so that it partakes of both position-responsiveness and draft-responsiveness may be achieved by an intermediate setting of the selector 144, which effects an intermediate positioning of the roller 136 on the arcuate edge 138 of the follower 120. These details form the subject matter of assignee's copending application Serial No. 516,347, filed June 20, 1955, and are accordingly only briefly described here.

It may be well at this point to cover the operation of the mechanism to the extent described, in which respect the effect of the second or tilt rockshaft 44 will be ignored and it will be assumed that the top link 60 is connected to the tractor at a single pivot point, as in assignee's copending application last referred to.

The implement is thus connected to the tractor by the hitch linkage 16, made up of the lower links 68 and 70 and the top link 60. The hand lever 86 is then moved rearwardly or in a counterclockwise direction so as to effect lowering of the implement, the draft responder 114 at this time being considered as static or stationary so that a rearwardly directed force through the connection 112 pivots the control arm or member 130 in a clockwise direction about the pivotal connection 134 to the link 132, the latter being urged forwardly by the spring 140 so that the roller engages the lower portion of the arcuate rear edge 138 of the follower 120. Pivotal movement of the arm 130 in the direction indicated causes counterclockwise rocking of the actuator rockshaft 106, which shifts the actuator 40 to the right as viewed in Fig. 4, exhausting the cylinder 30 so that the implement lowers by its own weight.

It is typical of this draft control, as it is of other well-known draft controls, that the depth of penetration of the plow bottoms in the soil will depend in part on the position of the hand lever 86. Hence, as the tractor and implement move forwardly, a draft load is imposed on the implement, which draft load is applied to the outer ends of the resilient bar 72 through the lower links 68 and 70. As the draft load is applied, the mid-portion 82 of the bar 72 is displaced forwardly, followed by the lower end of the draft responder 114, whereupon this responder pivots in a counterclockwise direction about the pivot 116 to cause the follower 120 to pivot in a clockwise direction, the upper portion of the responder rocking at 148 on the cam 124 of the rockshaft 32. Clockwise rocking of the follower 120 exerts a rearward force through the link 132 to the arm 130. This arm now pivots in a counterclockwise direction about its connection to the connecting means 112 as a fulcrum, thus incurring clockwise rocking of the actuator rockshaft 106 so as to shift the actuator 40 in the other direction, whereby fluid under pressure is supplied to the cylinder 30 so that the rockshaft 32 raises the implement to a new operating position at which the draft load is balanced against the fixed position of the hand lever 86. As will be understood, variations in position of the actuator 40 and return thereof to neutral will occur as draft load varies between the implement and the tractor, from which it will be clear that should the draft load lighten or should even compressional forces develop in the links 68 and 70, the bar 72 will bend in the opposite direction, thus effecting movements just the reverse of those previously described.

When the selector lever 144 is moved to its maximum upper position, it pulls the link 132 to its maximum upper position so that the roller 136 engages the arcuate edge 138 substantially directly rearwardly of the point of contact of the follower 120 with the rockshaft cam 122.

In this position, draft or load control is locked out and the actuator 40 is thus responsive to the manual control 86 and to the position-responsive means 108. For example, with the link 132 in the assumed upper position, initial actuation of the actuator will depend upon initial positioning of the hand lever 86 and when the implement reaches a position proportional to the position of the hand lever 86, the rockshaft cam 124 acting through the link 132 will return the actuator or valve 40 to neutral. If it be assumed that the hand lever 86 is moved rearwardly to effect lowering of the implement, the actuator 40 is shifted to the right as seen in Fig. 4 and the cylinder 30 is exhausted to the reservoir 96. As the implement lowers, the rockshaft 32 rocks in a counterclockwise direction and the shape of the rockshaft cam 124 is such as to swing the follower 120 in a counterclockwise direction about the pivotal connection of the follower to the upper end of the draft responder 114. Since the link 132 is in its upper position, it is in effect connected directly to or responds directly to the position of the cam 124, and rearward displacement of the link 132 pivots the arm 130 about its pivotal connection to the connecting means 112 to swing the rockshaft arm 106 in a clockwise direction for moving the actuator to the left and back to its neutral position. In short, the position-responsive means functions generally like any proportional follow-up mechanism.

With the foregoing as a background, the relationship thereof to the leveling control will be readily understood from the following description.

The actuator or valve 52 for the leveling control is actuated in the first instance by a valve rockshaft 150 (Figs. 3 and 5), and this rockshaft has fixed thereto an upstanding arm 152 which is in turn connected by a link 154 to a lever or beam 156. The connection between the beam 156 and the link 154 is pivotal at 158 and the lower end of the beam 156 is pivotally connected at 160 to an arm 162 on the tilt rockshaft 44. The upper end of the beam 156 is articulately linked at 164 to a rod or member 166 which is supported at 168 in a portion of the tractor body part 20 for fore-and-aft movement. A depending arm or lever 170 is pivotally connected at 172 at its upper end to the rod 166 and is pivotally connected at 174 at its lower end to a sheathed wire connector 176 which is in turn connected to the tilt control lever 88, so that the actuator 52 is initially responsive to movement of the lever 88.

The rockshaft 32 carries a second cam or responder 178 which actuates a swingable arm 180 that is pivotally supported, as at 182, on a portion of the tractor rear body part 20. An arcuate slot 184 in the depending arm 180 receives a follower 186 on the front end of a force-receiving part or link 188, the rear end of which is pivotally connected at 190 to an intermediate portion of the depending member 170. A spring 192 is connected to the lower end of the arm 180 and is anchored at 194 to a portion of the tractor body 20 and operates to maintain contact between the arm 180 and the cam 178 on the rockshaft 32.

From the description thus far, and having reference to Figs. 4 and 5, it will be seen that rocking of the tilt control lever 88 to the rear or in the "A" direction will swing the arm 170 in a clockwise direction about its fulcrum 190, the arm 180 being temporarily static because of the spring 192. As the member 170 swings as aforesaid it displaces the rod 166 in a forward direction, thereby rocking the beam 156 about the fulcrum 160 on the tilt rockshaft 44. Force transmitted through the link 154 rocks the actuator rockshaft 150 in a clockwise direction and shifts the actuator 52 to the right as seen in Fig. 4, supplying fluid under pressure to the cylinder 42 via the fluid line 102 so that the device 28 extends and causes counterclockwise rocking of the rockshaft 44. Hence, the external arm 58 moves rearwardly and transmits force through the top link 60 to the mast 62 on the implement to tilt the implement in such direction that the points of the plow bottoms nose upwardly.

The actuator 52 is the beneficiary of a follow-up action so that it returns to neutral in response to the achievement by the rockshaft 44 of a position proportional to the position of the manual control lever 88. This follow-up action is effected through the beam 156 and rod 166. For example, as the rockshaft 44 rocks in a counterclockwise direction, the arm 162 on the rockshaft swings the beam 156 in a clockwise direction and as the beam does so it pivots about its upper end and pulls on the link 154 to rock the actuator rockshaft 150 in a counterclockwise direction, thus restoring the actuator 52 to neutral.

In Fig. 4, as well as in Fig. 5, the position-responsive mechanism is designated in its entirety by the numeral 196, and the mechanism by means of which the leveling rockshaft 44 is automatically responsive to the position of the main or lift rockshaft 32 is indicated in its entirety by the numeral 198. The details of the mechanism 198 are illustrated generally in Fig. 5 and more specifically in Figs. 7, 8 and 9 in connection with control mechanism, designated in its entirety by the numeral 200, for selectively engaging or disengaging the interconnecting means 198 between the lift rockshaft cam 178 and the tilt rockshaft actuator 52. The control mechanism will be next described, preceded only by a brief description of the function of the interconnecting means 198 when engaged between the main rockshaft and the tilt rockshaft actuator.

Having reference to Fig. 1, and assuming that the top link 60 is pivotally connected to the rear of the tractor at a fixed point, as in the conventional three-point hitch (except for fore-and-aft displacement in connection with draft control), the position occupied by the implement when the outfit passes through a swale is represented by the dotted lines, which clearly demonstrates that the tendency of the plow bottoms is to run out of the ground. The reverse situation is illustrated in Fig. 2, which shows that, without leveling control, the tendency of the plow bottoms is to nose down when the outfit passes over a ridge. This characteristic is undesirable and it is accordingly one of the features of the invention to correctively adjust the implement to accommodate changes in position thereof resulting from travel of the outfit over undulating terrain.

For the present, it will be assumed that the draft control selector lever 144 is set in the position shown in Fig. 5, which effects draft control of the main rockshaft actuator 40, after the initial plowing depth has been selected by the lift rockshaft control lever 86. As the outfit progresses under normal conditions, the draft load will remain substantially constant and a uniform plowing depth will be achieved. Now, should the outfit encounter a swale (Fig. 1), the forward end of the tractor will pitch upwardly and the upward force transmitted through the lift links 56 will tend to cause clockwise rocking of the main rockshaft 32. As this occurs, the cam 178, fixed to that rockshaft, swings the depending arm 180 rearwardly and, the follower 186 on the link 188 being in the bottom of the slot 184 and consequently most remote from the arm pivot 182, the link or force-receiving part 188 will be displaced rearwardly, whereupon the member 170 will pivot about the point 174 as a fulcrum (since the position of the lever 88 is fixed), displacing the control rod rearwardly and causing counterclockwise rocking of the actuator beam 156, which in turn causes counterclockwise rocking of the actuator rockshaft 150 for the tilt rockshaft valve or actuator 52. The valve 52 then shifts to the left as seen in Fig. 4 and supplies fluid under pressure from the line 98 to the cylinder line 100, contracting the motor or device 28 so as to effect clockwise rocking of the tilt rockshaft 44. As the tilt rockshaft external arm 58 moves forwardly, it exerts a tensional force through the top link 60 which causes the implement to tilt correctively forwardly so that the plow bottoms nose down as illustrated in full lines in Fig. 1. As the correct position is assumed, the follow-up mechanism 196 returns the valve or actuator 52 to neutral, in the manner described above.

The reverse is true when the outfit passes over a ridge, as illustrated in Fig. 2, in which case the implement rises as the forward end of the tractor pitches downwardly and the draft load decreases, thus operating through the draft control system previously described to cause counterclockwise rocking of the rockshaft 32. Because of the shape of the rockshaft cam 178, the arm 180 now moves forwardly or in a counterclockwise direction under action of the spring 192 and transmits force through the force-receiving part or link 188 to swing the arm 170 in a forward or clockwise direction about the point 174 as a fulcrum, whereupon the rod 166 is displaced forwardly to act through the beam 156 for rocking the actuator shaft 150 for the actuator 52 in a clockwise direction to shift the actuator 52 to the right as seen in Fig. 4, whereupon fluid under pressure is supplied to the cylinder 42 via the cylinder line 102 for extending the cylinder to cause counterclockwise rocking of the tilt rockshaft 44. This movement of the rockshaft is translated by the link 60 to rearward tilting of the implement 18 to the corrective position shown in full lines in Fig. 2.

From the foregoing, it will be seen that the automatic leveling control is responsive to or takes its signal from the main rockshaft 32, which is a significant feature of the present invention. Hence, by the simple expedient of a pair of tractor-mounted power-operated devices, here 26 and 28, adequate control of the implement is afforded for both vertical adjustment and for fore-and-aft leveling. In addition to the above, either of the devices may be manually controlled, which is important from the standpoint of selecting the initial correct position of the implement as respects its fore-and-aft and depth relationship to the ground. In the system as designed, the maximum range of compensation for both ridge and swale operation will be obtained when the tilt rockshaft is adjusted manually so that the tilt control lever 88 is approximately in its mid-position.

Since there are circumstances, both in field operation and in the use of other implements, in which the automatic fore-and-aft leveling mechanism may not be necessary or desirable, the present invention affords the means 200 by which the mechanism may be locked out, which in effect accomplishes disconnection of the interconnecting means 198 between the main rockshaft 32 and the tilt rockshaft actuator 52. As will be brought out below, this lockout mechanism features selective control from either of two sources, the first of which is responsive to movement of the manual control lever 86 to its full-raised or extreme position, and the second of which includes a second control member in the form of manual selector means 202. With respect to the function of the manual control lever 86 relative to the part it plays in locking out the mechanism 200, it should be remembered that the lever is movable through a range including opposite extreme positions, one of which establishes the full-lowered position of the implement and the other of which establishes the full-raised position of the implement.

Figure 7:
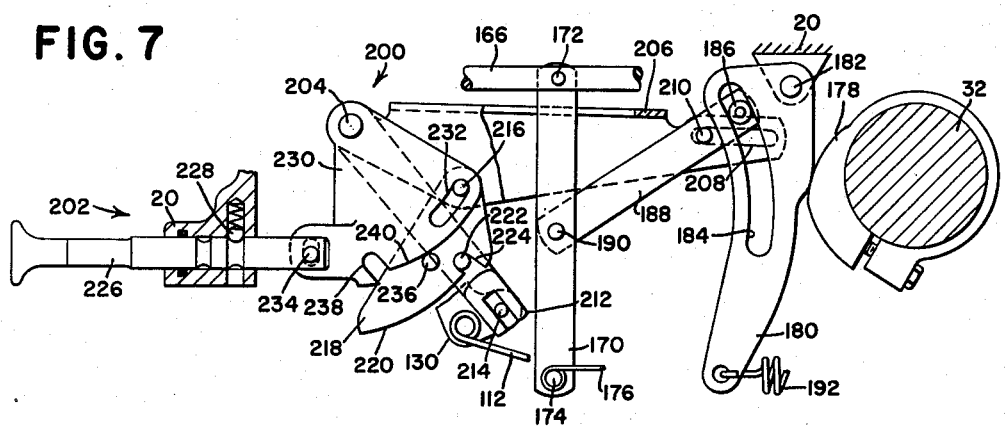
Figs. 7, 8 and 9 are views showing different positions of the servo mechanism between the lift rockshaft and the fore-and-aft rockshaft actuator.
Figure 8:
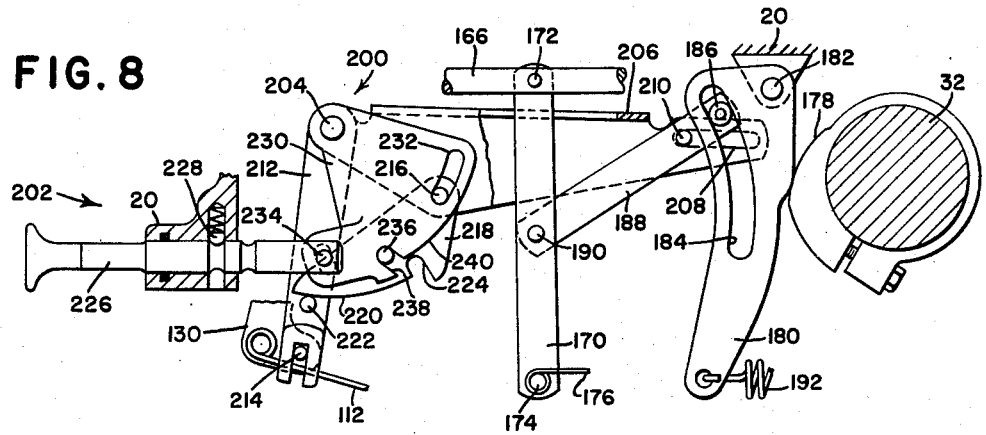
Figure 9:
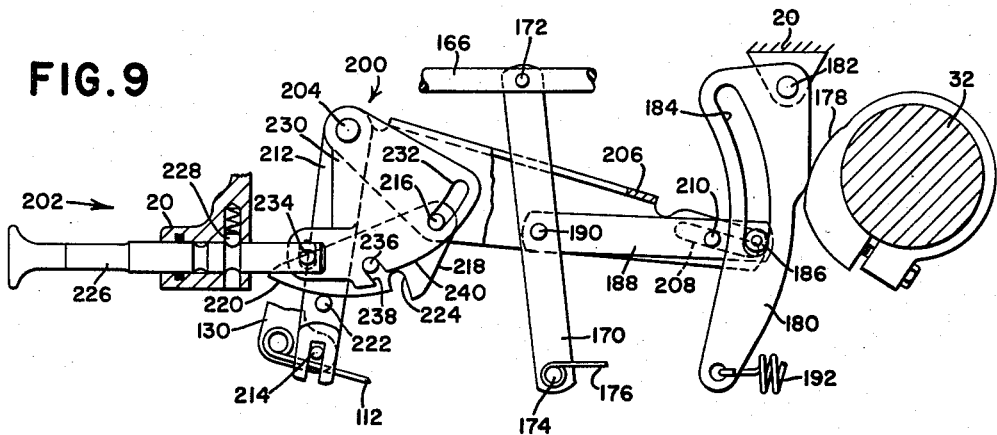

The lockout mechanism 200, best shown in Figs. 7 through 9, is schematically related to the remainder of the structure in Fig. 5.

The depending arm 180, which is responsive to the cam 178 on the rockshaft 32, has been previously described as having an arcuate slot 184, which slot is formed about the pivot point 190 as a center. As long as the force-receiving part or link 188 is in the lower part of the slot, as shown in Figs. 5 and 9, the leveling control system is automatically responsive to changes in position of the main rockshaft 32, because of the moment arm between the pivot 182 and the follower 186 when at the lowest portion of the slot 184. From the foregoing, it follows that as the follower 186 is moved closer to the pivot 182 for the lever 180, the moment arm decreases and the slot 184 is so designed that the moment arm is negligible in effect, whereby, when the link 188 is swung to its upper position, as shown in Figs. 7 and 8, movement of the arm 180 in response to rocking of the rockshaft 32 may occur without any effect on the interconnecting means 198. In other words, the fore-and-aft leveling mechanism will not be responsive to changes in position of the main rockshaft 32. It is in connection with the selective changing of the position of the force-receiving part or lever 188 that the mechanism 200 is significant.

The support means afforded by the rear tractor body part 20 carries a transverse pivot shaft 204 on which a fore-and-aft extending shiftable element 206 is swingably mounted for movement between a down position as shown in Fig. 9 and an up position as shown in Figs. 7 and 8. The forward end of the element 206 has therein a slot 208 which receives a pin 210 carried by the link 188, thus effecting a connection between the two so that as the element 206 changes position, the link 188 changes position between the bottom and top ends of the slot 184 in the arm 180.

Also mounted on the pivot shaft 204 is a depending control arm or member 212 which at its lower end has a pin and slot connection 214 with the control member 130. Since the control member 130 is connected by the means 112 to the manual control lever 86 for the main rockshaft lift device 26, it follows that a connection is made between the lever 86 and the arm or member 212. For all practical purposes, the arms 130 and 212 may be considered as one, but design limitations have established the two as separate components. The shiftable element 206 has projecting laterally therefrom a pivot pin 216 which is preferably positioned forwardly of and at a level below the axis of the pivot shaft 204. This pin pivotally mounts a first link or force-transmitting means 218, which link extends rearwardly and downwardly alongside the arm 212, having a lower arcuate edge 220 which normally rests on is supported by a lug or pin 222 fixed to a lower portion of the arm 212. As long as the link 218 is supported in the positions of Figs. 8 and 9, the edge 220 is arcuate about the axis of the pivot shaft 204. However, as will appear below, the link 218 does change position and the concentricity referred to at times disappears.

From the foregoing, it will be apparent that the position of the shiftable element 206, and consequently of the force-receiving part or link 188, is dependent in one instance on the position of the control arm 212, which is responsive to the position of the manual control lever 86. The force-transmitting connection between the arm 212 and the element 206 is established by the link 218 by means of the drive lug or pin 222 on the arm 212 and a notch 224 in the link. The lug and notch thus establish a disengageable drive connection between the arm 212 and the link 218. This drive connection includes lost-motion provision so as to permit a substantial range of swinging of the arm 212 between its rear position as shown in Figs. 8 and 9 and a front or forward position as shown in Fig. 7, during an intermediate part of which range swinging of the arm may occur without any effect on the element 206. This is to accommodate an independent range of movement of the lever 86 for controlling the lift rockshaft motor 26 without effect on the interconnecting means between the rockshaft 32 and the tilt rockshaft actuator 52. However, when the lever 86 is moved to its extreme full-raised position the lug 222 picks up the link 218 via the notch 224 and moves the element 206 to its up position. This is illustrated in Fig. 7. Hence, the interconnecting means or automatic fore-and-aft leveling feature is locked out in response to movement of the manual control lever 86 to its full-raised position. As the lever 86 is returned to its full-lowered position, the drive connection 222—224 returns the element 206 to its down position and again connects the force-receiving part 188 in operative relation to the arm 180.

In addition to control of the element 206 by the means just described, the element is responsive to selective positioning of the manual selector means 202. As best shown in Figs. 7, 8 and 9, this selector is in the form of a rod 226 which serves as a second control member and which has front and rear positions established by releasable means, here in the form of a detent 228. The rear position of the member 226 is shown in Figs. 7 and 9; and the front position is shown in Fig. 8. When the member is in its rear position, the interconnecting means 198, unless changed by the manual control lever 86, is in its operative or engaged position.

Control of the position of the element 206 by the selector member 226 results from the utilization of a second link or force-transmitting means 228 and its cooperation between the element 206 and the first link 218.

The link 230 is in the form of a plate having at its forward portion an arcuate slot 232 formed about the axis of the pivot shaft 204. This slot receives and guides the drive pin 216 that connects the link 218 to the element 206. The plate 228 depends alongside the arm 212 and also alongside the first link 218 and has its rear portion connected by a pivot and slot connection 234 to the forward portion of the selector member 226. Hence, the angular position of the link or plate 230 depends upon the fore-and-aft position of the member 226.

The link 218 carries a drive pin 236 which is normally received by a notch 238 in the link or plate 230. The shape of the notch 238 is such that it is arcuate about the pivot pin 216. The plate also includes an arcuate under edge 240 which cooperates at times with the lug or pin 236 on the link 218 and serves as means for maintaining engagement of the disengageable drive connection 222—224 between the arm 212 and the link 218. The pin or lug 236 and the notch 238 themselves establish a second disconnectible drive connection between the link 230 and the link 218.

When the manual control lever 86 is out of its extreme or full-raised position and the selector member 226 is in its rearward position, the parts assume the relative positions shown in Fig. 9. As already described, movement of the manual control lever 86 to its maximum full-raised position effects the change illustrated in Fig. 7, whereby the element 206 is raised to its up position independently of the position of the manual selector means 202, which retains its Figs. 7 and 9 position.

Fig. 8 illustrates control of the position of the element 206 by the selector means 202 while the arm 212 retains its original or rear position. In effecting the change from Fig. 9 to Fig. 8, the selector member 226 is moved inwardly and is releasably held by the detent 228. As the member 226 moves inwardly, it rocks the plate or link 230 forwardly and upwardly. The pin or lug 236 on the link 218 is received in the notch 238 in the link 230 and force is transmitted to the link 218 and hence to the element 206 via the pin 216.

It will be seen from the above that either of the control members 212 or 226 may be utilized to move the shiftable element 206 from its down position (Fig. 9) to its up position (Figs. 7 or 8), and that either of these members may so operate while the other member retains its initial or rear position. In this respect, it should be noted that the expressions "rear," "front" etc. are representative only and are used in the interests of clarity and not as indicating that other arrangements of the parts would not be beneficial.

When the control member 212 (responsive in the first instance to movement of the control lever 86 to its full-raised position) is used to lock out the automatic mechanism or interconnecting means 198, the member 212 swings first from its position of Fig. 9 through an intermediate phase until the pin or lug 222 picks up the link 218 via the notch 224. As the member continues to move forwardly, with the pin 222 engaging the notch 224, the first movement of the link will be downwardly and forwardly about the pin 216 as a pivot, which enables the pin 236 on the link 218 to be withdrawn from the notch 238 on the other link 230, which is possible because of the previously described arcuate disposition of the notch 238, and which is also possible because as the pin 222 enters the notch 224, the link 218 can drop to the extent permitted by the depth of the notch 224. As the pin 236 on the link 218 is withdrawn from the notch 238, it engages under the arcuate edge 240 of the link 230. Since this link is fixed by the detent means 228 on the selector 202, the link 230 acts as a guide and the now engaged pin 236 follows the arcuate edge and thus prevents upward displacement of the link 218. Hence, the pin 236 and edge 240 constitute means for maintaining engagement of the drive connection 222—224, which is best apparent in Fig. 7. As the element 206 is raised by the means just described, the pin 216 travels to the upper end of the slot 232 in the link or plate 230. If at this time it is desired to move the selector member 226 inwardly to retain the locked out position of the element 206, the same may be accomplished without any difficulty, since the plate 230 is shifted upwardly and forwardly as the selector member 226 moves inwardly, the result being that the notch 238 in the plate 230 now engages the pin 236 and retains the element 206 in its up position even though the manual control lever 86 is used to return the control member 212 to its original or rear position.

However, assuming that the selector is not moved inwardly as stated above, the return of the arm 212 to its rear or original position will incur return of the element 206 to its down position. This will be apparent from Fig. 7, when it is considered that the disengageable drive connection 222—224 is maintained in engagement by the means 236—240. Hence, as the arm 212 is swung rearwardly, it will act through the link 212, drive connection 222—224 and pin 216 to swing the element 206, and its connected part 188, downwardly.

When the selector means 202 is used to independently lock out the means 198, force is transmitted to the element 206 via the link means 218 and the drive connection 236—238. In this phase of movement, the lower arcuate edge 220 on the link 218 rides on the pin 222 on the arm 212, and the link is prevented from dropping downwardly and forwardly. Hence, the means 220—222 serves as means for maintaining the effectiveness of the drive connection 236—238 during operation of the lockout mechanism by the selector 202.

In addition to the mutual cooperation between the several components just described, the mechanism has the further advantage of being simple and compact and readily associated with load and position control mechanisms of the character illustrated. The means 198 and the means 200 readily lend themselves to modification for use with other types of controls. Apart from the detailed characteristics of the lockout and interconnecting means just described, the over-all relationship between the raise and lower control and the fore-and-aft control improves the performance of the implement by maintaining its relationship parallel to the ground. In addition the manual control effected through the means 88 and the actuator 52 will improve the characteristics of the implement as to ground entry, depth adjustment and transport, among others. Features of the invention not categorically enumerated will readily occur to those versed in the art, as will modifications and alterations in the preferred embodiment illustrated, all of which may be achieved without departure from the spirit and scope of the invention.

What is claimed is:

1. In a tractor-implement outfit in which the implement is connected to the tractor for vertical movement and also for fore-and-aft tilting relative to the tractor, the improvement comprising: a power-operated lift rockshaft mounted on the tractor for rocking selectively in opposite directions; two-way force-transmitting means interconnecting the implement and said rockshaft for moving the implement vertically by power-operated rocking of said rockshaft and for causing rocking of said rockshaft by vertical movement of the implement when the tractor pitches relative to the implement; a tilt rockshaft connected to the implement and carried by the tractor for selective rocking in opposite directions to cause fore-and-aft tilting of the implement; actuator means connected to and for operating the tilt rockshaft; and means interconnecting the actuator means and the lift rockshaft for operating the actuator means to cause rocking of the tilt rockshaft so as to correctively tilt the implement in response to rocking of the lift rockshaft by vertical movement of the implement when the tractor pitches as aforesaid.

2. In a tractor-implement outfit in which the implement is connected to the tractor for vertical movement and also for fore-and-aft tilting relative to the tractor, the improvement comprising: a power-operated lift member mounted on the tractor for movement selectively in opposite directions; force-transmitting means interconnecting the implement and said member for moving the implement vertically by power-operated movement of said member and for causing movement of said member by vertical movement of the implement when the tractor pitches relative to the implement; power-operated tilt means connected to the implement and carried by the tractor and selectively operative to cause fore-and-aft tilting of the implement; actuator means connected to and for operating the tilt means; and means interconnecting the actuator means and the lift member for actuating the actuator means to cause operation of the tilt means to correctively tilt the implement in response to movement of the lift member by vertical movement of the implement when the tractor pitches as aforesaid.

3. The invention defined in claim 2, including: manually operative means connected to and for operating the actuator means independently of operation thereof via the lift member.

4. The invention defined in claim 2, in which: the means interconnecting the actuator means and the lift member is optionally engageable to actuate the tilt means via said lift member or disengageable to enable movement of said lift member independently of effect on said tilt means; and means is provided for selectively engaging and disengaging said interconnecting means.

5. The invention defined in claim 4, in which: the means for engaging and disengaging the interconnecting means includes control means for selectively incurring power-operated movement of the lift member in opposite directions, said control means being movable through a range including opposite extreme positions; and means connecting the control means to the interconnecting means for disengaging said interconnecting means upon movement of said control means to one of its extreme positions.

6. The invention defined in claim 5, including: selector means in addition to the control means and movable between first and second positions, said selector means being connected to the interconnecting means for disengaging said interconnecting means independently of the control means.

7. The invention defined in claim 2, in which: the means interconnecting the actuator means and the lift member is optionally engageable to actuate the tilt means via said lift member or disengageable to enable movement of said lift member independently of effect on said tilt means; and means is provided for selectively engaging and disengaging said interconnecting means, said interconnecting means including: a force-receiving part movable between engaged and disengaged positions as respects the lift member, and said selective means includes a shiftable element on the tractor and connected to said part for movement from a first position to a second position corresponding respectively to the engaged and disengaged positions of said part; a first member movable on the tractor from a first position to a second position; first force-transmitting means between the element and the first member for shifting the element to and from its second position upon movement of the first member to and from its second position, said force-transmitting means including a disengageable drive connection enabling shifting of said element to its second position while the first member retains its first position; a second member movable on the tractor from a first position to a second position; and second force-transmitting means between said second member and the first force-transmitting means for moving the element to and from its second position upon movement of the second member to and from its second position, said second force-transmitting means including a normally engaged drive connection to said first force-transmitting means that is disengageable upon movement of the first force-transmitting means by the first member.

8. In an implement control system of the class described, the combination including: fore-and-aft support means; a transverse pivot shaft carried by the support means; a controllable element mounted on and extending forwardly from said shaft and swingable about the axis thereof from a down position to an up position; a control arm mounted on and depending from the pivot shaft in a rear position and swingable relative to the element about the axis of said shaft to a forward position, said arm having a drive lug projecting laterally therefrom below said shaft; a pivot pin projecting laterally from the element ahead of the pivot shaft; a first link pivoted on said pin and projecting downwardly and rearwardly and alongside the control arm and having resting on said lug a lower edge arcuate about the pivot shaft, said link having in said edge and ahead of said lug a notch engageable by said lug upon forward swinging of said control arm, whereby swinging of the control arm to its forward position picks up said link and raises the element to its up position; a second link mounted on the pivot shaft alongside the first link for swinging from a rear position to a front position and having therein a slot receiving the pin on the element, said slot being arcuate about the pivot shaft and said pin being at the bottom of said slot in the rear position of said second link; said second link further having a downwardly and forwardly opening notch therein and said first link having a laterally projecting lug thereon rearwardly receivable by and forwardly disengageable from said second link notch, whereby said first link may be swung forwardly via the control arm to raise the element while the second link retains its rear position and whereby forward and rearward swinging of said second link acts through said first link via said second link notch and first link lug to swing said element respectively to its up and down positions while the control arm retains its rear position; and means for swinging the second link.

9. The invention defined in claim 8, in which: the last-named means includes a bi-positionable member carried by the support means and connected to said second link, and releasable means cooperative between the support means and the member for releasably retaining either position of said member.

10. The invention defined in claim 9, in which: the second link has a lower edge formed arcuately about the pivot shaft and extending ahead of the second link notch and engageable with the first link lug to confine the first link against upward and rearward movement during swinging of said first link by the control arm.

11. In an implement control system of the class described, the combination including: fore-and-aft support means; a transverse pivot shaft carried by the support means; a controllable element mounted on and extending forwardly from said shaft and swingable about the axis thereof from a down position to an up position; a control arm mounted on and depending from the pivot shaft in a rear position and swingable relative to the element about the axis of said shaft to a forward position, said arm having a drive lug projecting laterally therefrom below said shaft; a pivot pin projecting laterally from the element ahead of the pivot shaft; a first link pivoted on said pin and projecting downwardly and rearwardly and along side the control arm and having resting on said lug a lower edge arcuate about the pivot shaft, said link having in said edge and ahead of said lug a notch engageable by said lug upon forward swinging of said control arm, whereby swinging of the control arm to its forward position picks up said link and raises the element to its up position; a second link mounted on the pivot shaft alongside the first link for swinging from a rear position to a front position; said second link further having a downwardly and forwardly opening notch therein and said first link having a laterally projecting lug thereon rearwardly receivable by and forwardly disengageable from said second link notch, whereby said first link may be swung forwardly via the control arm to raise the element while the second link retains its rear position and whereby forward and rearward swinging of said second link acts through said first link via said second link notch and first link lug to swing said element respectively to its up and down positions while the control arm retains its rear position; and means for swinging the second link.

12. The invention defined in claim 11, in which: the last-named means includes a bi-positionable member carried by the support means and connected to said second link, and releasable means cooperative between the support means and the member for releasably retaining either position of said member.

13. The invention defined in claim 11, in which: the second link has a lower edge formed arcuately about the pivot shaft and extending ahead of the second link notch and engageable with the first link lug to confine the first link against upward and rearward movement during swinging of said first link by the control arm.

14. In an implement control system of the class described, comprising: support means; a shiftable element movable on the support means from a first position to a second position; a first member movable on the support means from a first position to a second position; first force-transmitting means between the element and the member for shifting the element to and from its second position upon movement of the member to and from its second position, said force-transmitting means including a disengageable drive connection enabling shifting of said element to its second position while the member retains its first position; a second member movable on the support means from a first position to a second position; and second force-transmitting means between said second member and the first force-transmitting means for moving the element to and from its second position upon movement of the second member to and from its second position, said second force-transmitting means including a normally engaged drive connection to said first force-transmitting means that is disengageable upon movement of the first force-transmitting means by the first member.

15. The invention defined in claim 14, including: means on the second link means operative, in the first position of the second control member, to maintain engagement of the drive connection between the first member and the first link means when the first member is in its second position.

16. The invention defined in claim 14, in which: the drive connection between the first member and first link means includes a lost-motion device enabling limited movement of said first member toward its second position before incurring shifting of the element.

17. The invention defined in claim 14, including: releasable means for selectively retaining the second control member in either of its two positions.

18. An implement control system for a tractor, comprising: first and second independent tractor-mounted power-operated rockshafts; an actuator for activating and deactivating the second rockshaft; a responder movable by the first rockshaft; force-transmitting means mobilized between the responder and the actuator for operating the actuator in response to movement of the responder, said force-transmitting means being selectively demobilizable to enable movement of the responder independently of effect on said actuator; and means for selectively mobilizing and demobilizing said force-transmitting means.

19. An implement control system for a tractor, comprising: first and second independent tractor-mounted power-operated rockshafts; first and second actuators respectively for activating and deactivating the rockshafts; first control means connected to the first actuator and movable through a range including extreme positions; a responder movable by the first rockshaft; force-transmitting means mobilized between the responder and the second actuator for operating the second actuator in response to movement of the responder, said force-transmitting means being selectively demobilizable to enable movement of the responder independently of effect on said second actuator; first means connected between said force-transmitting means and the first control means for selectively mobilizing and demobilizing said force-transmitting means upon movement of the first control means from one extreme position to another; and second control means connected to said force-transmitting means for selectively mobilizing and demobilizing said force-transmitting means independently of said first control means.

20. An implement control system for a tractor, comprising: first and second independent tractor-mounted power-operated rockshafts; an actuator for activating and deactivating the second rockshaft; a responder movable by the first rockshaft; force-transmitting means mobilized between the responder and the actuator for operating the actuator in response to movement of the responder, said force-transmitting means being selectively demobilizable to enable movement of the responder independently of effect on said actuator; and a pair of separate control means independently operative for selectively mobilizing and demobilizing said force-transmitting means.

21. An implement control system for a tractor, comprising: first and second independent tractor-mounted power-operated implement-adjusting devices; an actuator for activating and deactivating the second device; a responder movable by the first device; force-transmitting means mobilized between the responder and the actuator for operating the actuator in response to movement of the responder, said force-transmitting means being selectively demobilizable to enable movement of the responder independently of effect on said actuator; and means for selectively mobilizing and demobilizing said force-transmitting means.

22. An implement control system for a tractor, comprising: first and second independent tractor-mounted power-operated implement-adjusting devices; first and second actuators respectively for activating and deactivating the devices; first control means connected to the first actuator and movable through a range including extreme positions; a responder movable by the first device; force-transmitting means mobilized between the responder and the second actuator for operating the second actuator in response to movement of the responder, said force-transmitting means being selectively demobilizable to enable movement of the responder independently of effect on said second actuator; first means connected between said force-transmitting means and the first control means for selectively mobilizing and demobilizing said force-transmitting means upon movement of the first control means from one extreme position to another; and second control means connected to said force-transmitting means for selectively mobilizing and demobilizing said force-transmitting means independently of said first control means.

23. An implement control system for a tractor, comprising: first and second independent tractor-mounted power-operated implement-adjusting devices; an actuator for activating and deactivating the second device; a responder movable by the first device; force-transmitting means mobilized between the responder and the actuator for operating the actuator in response to movement of the responder, said force-transmitting means being selectively demobilizable to enable movement of the responder independently of effect on said actuator; and a pair of separate control means independently operative for selectively mobilizing and demobilizing said force-transmitting means.

24. In a tractor-implement outfit in which the implement is connected to the tractor for vertical movement and also for fore-and-aft tilting relative to the tractor, the improvement comprising: means providing a housing and support structure rigid on the tractor; a power-operated lift rockshaft mounted on said structure for rocking selectively in opposite directions and having a portion extending externally of said structure; two-way force-transmitting means interconnecting the implement and said rockshaft portion for moving the implement vertically by power-operated rocking of said rockshaft and for causing rocking of said rockshaft by vertical movement of the implement when the tractor pitches relative to the implement; a tilt rockshaft carried by said structure for selective rocking in opposite directions and having a portion extending externally of said structure and said portion being connected to the implement to cause fore-and-aft tilting of the implement in response to rocking of said tilt rockshaft; actuator means carried and enclosed by said structure and connected to and for operating the tilt rockshaft; and means carried and enclosed by said structure and interconnecting the actuator means and the lift rockshaft for operating the actuator means to cause rocking of the tilt rockshaft so as to correctively tilt the implement in response to rocking of the lift rockshaft by vertical movement of the implement when the tractor pitches as aforesaid.

25. In a tractor-implement outfit in which the implement is connected to a tractor for vertical movement and also for fore-and-aft tilting relative to the tractor, the improvement comprising: means providing a housing and support structure rigid on the tractor; a power-operated lift member carried by said structure for movement selectively in opposite directions and including a portion projecting externally of said structure; force-transmitting means externally of said structure and interconnecting the implement and said member portion for moving the implement vertically by power-operated movement of said member and for causing movement of said member by vertical movement of the implement when the tractor pitches relative to the implement; power-operated tilt means carried by said structure and including a portion internally of said structure and a portion externally of said structure, said external portion being connected to the implement and said tilt means being selectively operative to cause fore-and-aft tilting of the implement; actuator means carried and enclosed by the structure and connected and for operating the tilt means; and means carried and enclosed by the structure and interconnecting the actuator means and the lift member for actuating the actuator means to cause operation of the tilt means to correctively tilt the implement in response to movement of the lift member by vertical movement of the implement when the tractor pitches as aforesaid.

26. An implement control system for a tractor, comprising: means providing a housing and support structure rigid on the tractor; first and second independent power-operated rockshafts carried by said structure and each including an internal portion within said structure and each further including an external portion outside said structure; an actuator carried and enclosed by said structure for activating and deactivating the second rockshaft and connected to the internal portion of said second rockshaft; a responder within said structure and movable by the internal portion of the first rockshaft; force-transmitting means within said structure and mobilized between the responder and the actuator for operating the actuator in response to movement of the responder, said force-transmitting means being selectively demobilizable to enable movement of the responder independently of effect on said actuator; and means for selectively mobilizing and demobilizing said force-transmitting means, said selective means including an external part accessible externally of said structure and a part internally of said structure and operative on the force-transmitting means.

27. The invention defined in claim 26, including: second selective means for optionally mobilizing and demobilizing said force-transmitting means independently of said first mentioned selective means, said second selective means also including an external part accessible from outside the structure and an internal part within said structure and operative on said force-transmitting means References Cited in the file of this patent

UNITED STATES PATENTS

| | | |
|---|---|---|
| 2,336,062 | Brown | Dec. 7, 1943 |
| 2,405,980 | Sands | Aug. 20, 1946 |
| 2,455,727 | Bunting | Dec. 7, 1948 |
| 2,704,015 | Wilson | Mar. 15, 1955 |
| 2,754,742 | Altgelt | July 17, 1956 |
| 2,755,721 | Rusconi | July 24, 1956 |
| 2,782,703 | Chambers | Feb. 26, 1957 |
| 2,815,703 | Talak | Dec. 10, 1957 |
| 2,832,276 | Heitshu | Apr. 29, 1958 |